UNITED STATES PATENT OFFICE.

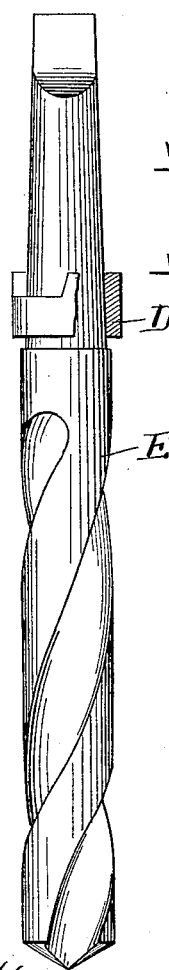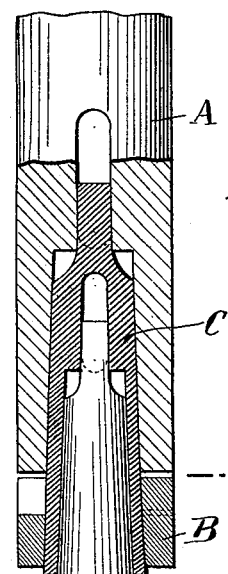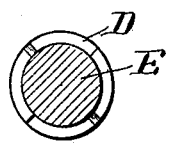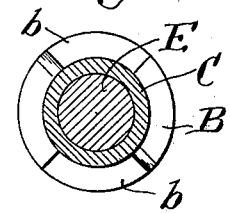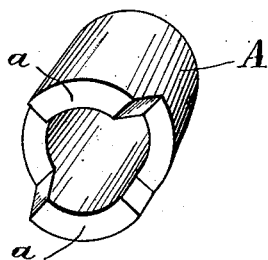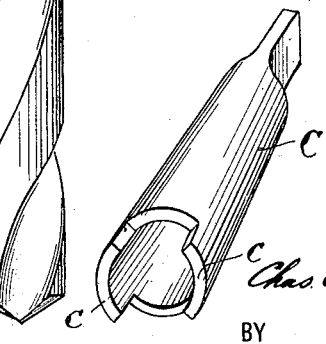

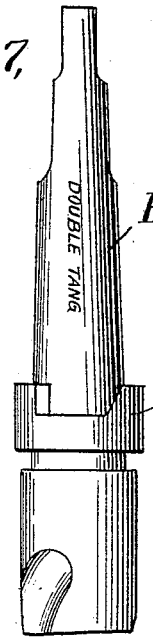
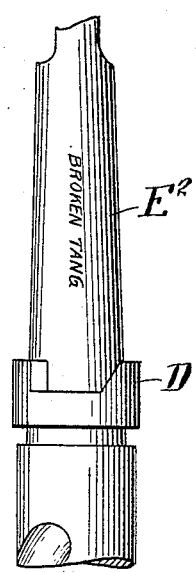
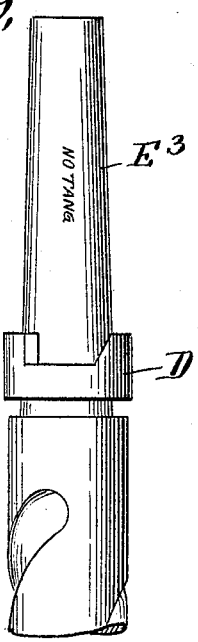
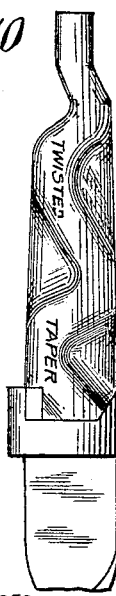
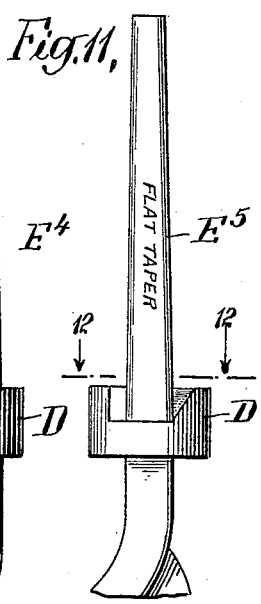
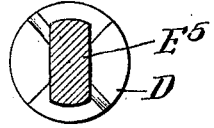
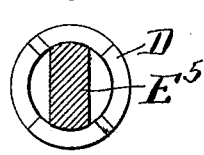
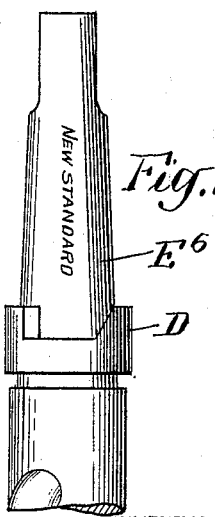

CHARLES A. SIMMONS, OF RENSSELAER, NEW YORK.

DRILL SOCKET AND COLLAR.

1,119,766.   Specification of Letters Patent.   Patented Dec. 1, 1914.

Application filed September 26, 1911. Serial No. 651,330.

*To all whom it may concern:*

Be it known that I, CHARLES A. SIMMONS, a citizen of the United States, residing at Rensselaer, New York, have invented certain new and useful Improvements in Drill Sockets and Collars; and I do hereby declare the following to be a full, clear, and exact description of the invention, such as will enable others skilled in the art to which it appertains to make and use the same.

This invention is directed to holding devices for spindle-driven tools, and resides in an improved arrangement of shank-embracing members to be used in connection with drills, reamers, and the like having standard taper round or flat shanks.

The object of the invention is to afford a device, which is capable of holding the tool and successfully applying to it driving force, even the excessive force employed in modern shop practice where the high speed steel tools are used; and which is at the same time of such character that it can be used interchangeably with the great variety of tool shanks found in modern shops, as well as with tool shanks from which the tank has been broken.

The round taper spindle-socket or sleeve has heretofore been found the most successful and practical means of holding metal-working drills, reamers, and similar tools; and the shanks of such tools are commonly formed with a tapered portion corresponding in length to the Morse standard. There are in common use six different standard lengths of shank, numbered 0, 1, 2, 3, 4 and 5, and, less commonly used, two larger sizes numbered 6 and 7. The spindle-sockets of machines with which such tools are to be used have a taper corresponding to one of these standard sizes. Such a spindle-socket is then adapted to hold shanks of smaller sizes by providing suitable tapered sleeves of standard size conforming in outward configuration to one of the shank sizes and internally to the next smaller size of shank, so that these sleeves may be used as an intermediary between the smaller shank and the larger spindle-socket. The tapered portion of the standard shanks is of such length that it is substantially covered by the spindle-socket, or the sleeve, when the tool is in place; a small margin, varying from one-eighth of an inch in size No. 0 to three-eighths of an inch in size No. 7, being left to permit the follow-up of the socket to compensate for wear. Although these standards of lengths and taper are generally adopted for tapered shank tools, yet the shanks themselves show considerable variation, several different forms having become widely used. The most widely used of these forms are illustrated in the drawings of this application, and each of them is characterized by a taper fitting the taper of the socket or sleeve and most of them by a tank adapted to extend into a tang-socket in the holder; but these different forms of shank entail the use of different forms of spindle-socket or sleeve. Inasmuch as it is hardly practicable to provide a machine with different forms of spindle-socket, the adaptation to the holder of the different forms of shank is practically confined to the employment of different sleeves. It results that a machine having a spindle-socket of given size can use only one type of shank of that size, its use with shanks of other types being confined to the smaller sizes in connection with which a sleeve, conforming on the outside to the standard spindle-socket and on the inside to the peculiar form of shank, may be used. Furthermore, it is common for the taper fit to fail owing to wear or deformation of the shanks, and thereafter the drive is applied to the tang alone, and when the tang breaks the tool becomes useless, since no means of driving it is at hand, although otherwise it may be perfectly good and capable of long life.

It is the aim of my invention to do away with the necessity which now exists for selecting in every case a sleeve or socket which conforms to the peculiarities of the tool shank, as well as with the waste incident to broken tangs. To this end there is provided a tool-holding device which is in effect a standard socket or sleeve, but which is made in two interlocking parts, one of which, termed herein the collar, is fastened, or is adapted to be fastened, permanently to the shank of the tool, and the other of which serves not only to receive the shank and enter into interlocking engagement with the collar, but likewise serves to hold in the ordinary manner a standard taper-shank tool whether it is equipped with the collar or not. This arrangement not only aims to do away with the inconveniences and waste above suggested, but it also aims to provide a driving connection which is entirely secure and will resist the most excessive strains, and it adapts itself to the tool-shanks now on the market without altering their construction and without increasing the working length of the tool from socket to cutting tip.

In the accompanying drawings, Figure 1 represents the lower end of a drill press spindle broken away and a sleeve and drill in place therein. Fig. 2 represents a drill provided with a collar, partially broken away. Fig. 3 represents a section on line 3—3 of Fig. 1. Fig. 4 represents a section on line 4—4 of Fig. 1. Fig. 5 is a view in perspective of the end of the drill press spindle. Fig. 6 is a view in perspective of the greater portion of a sleeve, and Figs. 7 to 14, inclusive, illustrate the collar of my invention applied to shanks of different, commonly employed, forms.

Referring to the drawings, the spindle A of a drill press is provided with a standard taper socket and drift hole as usual, but is shortened and provided upon its lower end with jaws $a$ (see Fig. 5) which are adapted to engage complementary jaws $b$ on a collar B, the engaging edges of the jaws being cut radially so that the parts are self-centering and the full strength of the metal is effective to resist the driving strain. The collar B has a tapered interior and when the jaws $a$ and $b$ are interlocked the drill press spindle socket and the collar B provide a taper socket which is substantially equal in length to the usual drill press socket.

In Fig. 1 the collar B is shown secured upon a sleeve C, which is used when a drill shank of a smaller size than the drill press socket is to be held. If a large drill having a shank corresponding to the drill press socket were shown the collar B would be mounted directly upon its shank.

The collar B may be secured upon the sleeve C in any suitable manner such as by a tight drive but as it is intended to be a permanent part of the sleeve C I prefer to shrink it on or rifle the collar and then force it on, and in some cases pin it or set the metal while hot into depressions ground in the surface of the sleeve. The collar is mounted upon the sleeve with due regard to the position of the tang and jaws so that when the sleeve is applied to the drill press socket the tang will enter its recess and the jaws $a$ and $b$ will interlock. It will now be seen that when properly assembled the sleeve may be driven by the tang, by its taper fit, and by the jaws $a$ and $b$. I prefer that the position of the collar be such that the tang and jaws may be brought into play at about the same time that both may take a portion of the drive together with the taper fit, and as the tang will usually twist some before breaking this condition is practically attainable. A sleeve or drill from which the tang has been broken away may be provided with the collar B and serve to good purpose.

The sleeve C is shown shortened and provided with jaws $c$ similar to jaws $a$ on the drill spindle and a collar D mounted on the drill E is provided with jaws $d$ which engage jaws $c$ in a manner similar to that in which the jaws $a$ and $b$ upon the drill spindle A and collar B engage. The sleeve C and collar D are together substantially equal in length to a standard sleeve so that no changes have to be made in the drill shanks used and the entire device occupies but the usual space below the drill press.

When my holding device is adopted in a manufacturing plant it is only necessary to shorten the drill press sockets and provide them with the jaws $a$. Each of the tools should be provided with a collar, but the change necessarily made in the drill press socket and sleeves does not preclude the use therein of standard drills which are not provided with collars. However, drills from which the tangs may have been broken or twisted may be used and the saving, in large drills especially, is marked. The advantages gained by the positive jaw drive are especially noticeable when high speed steels are used in the manufacture of drills, as the standard tang does not present sufficient strength to attain the maximum drill efficiency.

The collars should be so tapered that sufficient space will appear between the sockets and collars to permit the socket to follow up and compensate for wear of the shank of the drill and of the socket and in the arrangement described this space does not interfere with the interlocking of the jaws. I prefer to incline the rear edges of the jaws to facilitate their engagement.

In Figs. 7 to 14 inclusive, I have illustrated several different forms of shanks equipped with the collar of my invention indicated in each case by the reference letter D. In Fig. 7 I have shown a commonly employed form of shank $E'$ having a double tang, it being customary to furnish for use with such tangs a sleeve shaped on its interior to engage both of the tangs, or the larger tang, so that if the smaller tang is broken off the tool is still available for use if an appropriate sleeve is at hand. In Fig. 8 there is shown a standard shank $E^2$ with the tang broken off. In Fig. 9 there is shown a shank $E^3$ without any tang at all. In Fig. 10 there is shown a form of twisted taper shank $E^4$ which is now widely used and has the advantage that the whole drill may be twisted up from a flat piece of metal. In Fig. 11 there is shown a flat taper shank $E^5$. In this case the collar may, in accordance with my invention, be made with a hole which fits the flat taper shank, as indicated in Fig. 12, which is a section on line 12—12 of Fig. 11, or I may employ just such an annular collar as I would use on a round taper shank, as indicated in Fig. 13, which is a like section of an identical shank with an annular collar. In either case the self-centering character of the sleeve and collar will have the effect to prevent wabbling of the flat taper shank even if it is considerably worn. In Fig. 14 is illustrated the so-called "new standard" shank $E^6$, which corresponds to the double tang shank of Fig. 7, with the exception that the end tang is cut off. It will be observed that it is only necessary, in each of these cases, to fasten the collar D on the shank and the tool becomes immediately available for use with an ordinary taper-socket or sleeve, provided that socket or sleeve has been shortened and cut to form the jaws suitable for interlocking engagement with the jaws on the collar. It thus becomes possible to provide all taper shank drills in a shop with these collars and then to confine the equipment of socket and sleeves to a uniform type such as is illustrated and described, and which is so shortened as to form, in conjunction with the collar, what is in effect a standard taper-socket or sleeve.

Having thus described my invention what I claim is:

1. In combination with a taper-shank tool, a collar secured to the base of the shank and a sleeve embracing the shank above the collar, the sleeve and collar together constituting a socket for the shank of the tool substantially equal in length to a standard socket and having a driving connection comprising projections thereupon making endwise interlocking engagement; substantially as described.

2. In combination with a taper-shank tool, an interiorly tapered collar secured to the base of the tapered portion of the shank and an interiorly tapered sleeve embracing the tapered portion of the shank above the collar, the sleeve and collar together constituting a tapered socket for the shank of the tool substantially equal in length to a standard socket, and having a driving connection comprising projections thereupon making endwise interlocking engagement; substantially as described.

3. In combination with a taper-shank tool, a collar secured to the base of the shank and a sleeve embracing the shank above the collar, the sleeve and collar having a driving connection comprising projections thereupon making endwise interlocking and self-centering engagement; substantially as described.

4. In combination with a taper-shank tool, a collar secured to the base of the shank and an interiorly tapered sleeve embracing the shank above the collar, the taper of the shank and sleeve being such and the collar being so placed, that a follow-up space is left between the sleeve and the collar, the sleeve and collar together constituting a socket for the shank of the tool substantially equal in length to a standard socket, and having a driving connection comprising projections thereupon making endwise interlocking engagement; substantially as described.

5. In combination with a taper-shank tool, a collar secured to the base of the shank and a sleeve embracing the shank above the collar, the sleeve and collar having a driving connection comprising projections thereupon making endwise interlocking engagement and having their engaging edges cut radially; substantially as described.

In testimony whereof I affix my signature, in presence of two witnesses.

CHARLES A. SIMMONS.

Witnesses:
CHARLES J. TOBIN,
CHAS. BETTS.

Copies of this patent may be obtained for five cents each, by addressing the "Commissioner of Patents, Washington, D. C."